No. 770,174. PATENTED SEPT. 13, 1904.
J. H. HOWARD.
FERTILIZER DISTRIBUTER.
APPLICATION FILED JULY 1, 1904.
NO MODEL.

Witnesses
G. R. Thomas
L. Hilton

Inventor
J. H. Howard
By H. B. Wilson
Attorney

No. 770,174.

Patented September 13, 1904.

UNITED STATES PATENT OFFICE.

JAMES H. HOWARD, OF EATONTON, GEORGIA.

FERTILIZER-DISTRIBUTER.

SPECIFICATION forming part of Letters Patent No. 770,174, dated September 13, 1904.

Application filed July 1, 1904. Serial No. 214,860. (No model.)

*To all whom it may concern:*

Be it known that I, JAMES H. HOWARD, a citizen of the United States, residing at Eatonton, in the county of Putnam and State of Georgia, have invented certain new and useful Improvements in Fertilizer-Distributers; and I do declare the following to be a full, clear, and exact description of the invention, such as will enable others skilled in the art to which it appertains to make and use the same.

My invention is an improved fertilizer-distributer for opening drills and depositing fertilizer therein; and it consists in the construction, combination, and arrangement of devices hereinafter described and claimed.

The object of my invention is to provide a fertilizer-distributing apparatus which is adapted to be used in connection with a plow-stock of ordinary form and which may be readily attached to and removed from the plow-stock.

Figure 1:
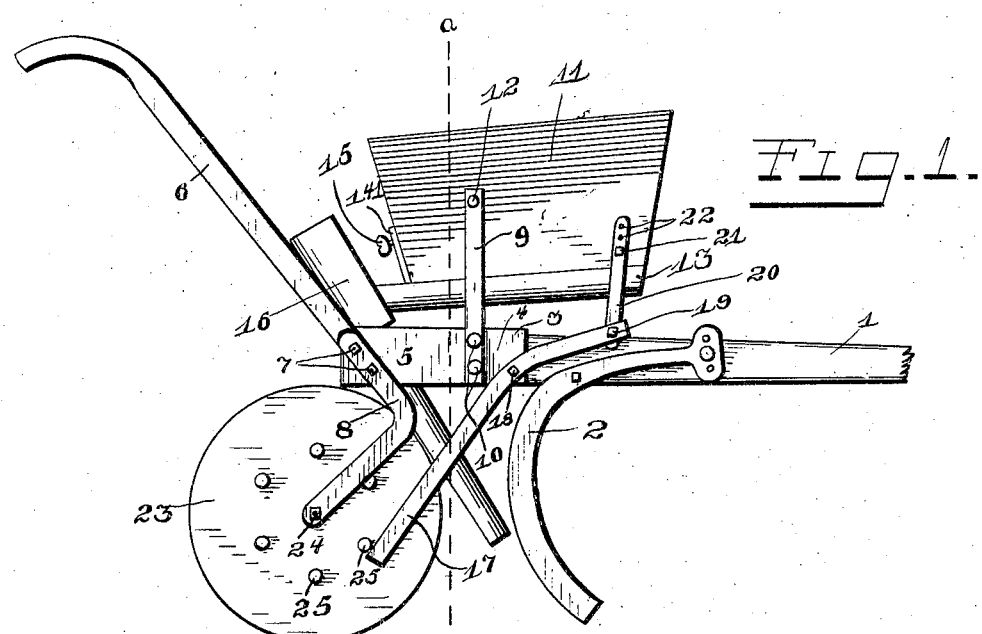
Figure 2:
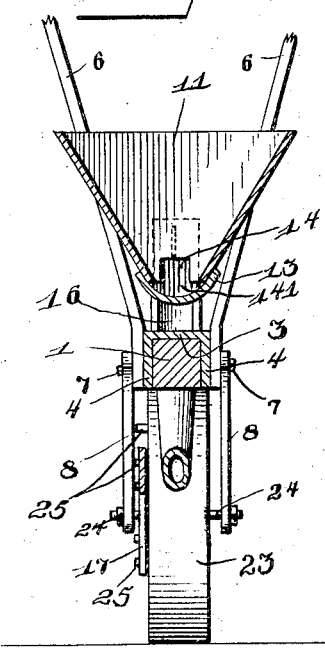
Figure 3:
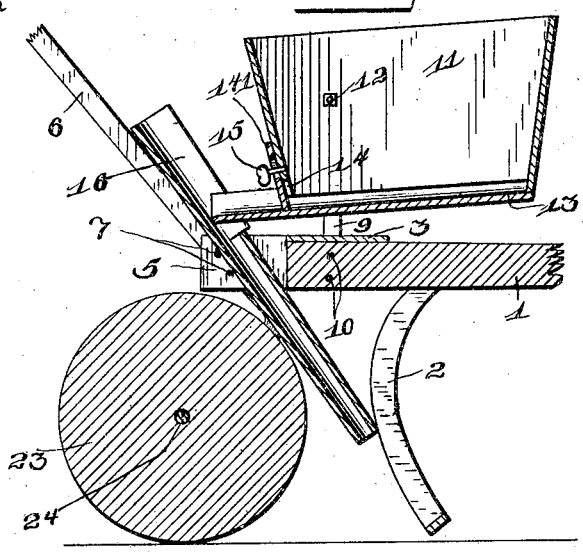

In the accompanying drawings, Figure 1 is a side elevation of a fertilizer-distributer embodying my improvements, showing the same attached to a plow-stock and in operative position. Fig. 2 is a vertical sectional view of the same, taken on the plane indicated by the line *a a* of Fig. 1. Fig. 3 is a vertical longitudinal sectional view taken on a plane intersecting the hopper.

The plow-stock here shown is of ordinary form and comprises the beam 1 and the standard 2. On the rear end of the plow-stock is fitted a saddle-plate 3, which is provided with depending side flanges 4, that bear on opposite sides of the plow-beam and are formed with rearward extensions 5, which project in rear of the rear end of the plow-beam. The handles 6 of the plow are secured to the rearwardly-extending portions 5 of the saddle-plate by means of bolts 7, which also serve to secure rearwardly and downwardly extending bracket-arms 8 to the saddle. On the side flanges of the latter are secured the lower ends of a pair of standard-bars 9 by means of bolts 10, said bolts also extending through the plow-beam and securing the saddle thereto.

A hopper 11, which is preferably of the form here shown, is mounted between the upper portions of the standard-bars 9 by means of pivots 12. The major portion of the hopper extends in front of the standard-bars. The bottom of the hopper is formed by a metallic spout 13, which is preferably made of suitable sheet metal and projects rearwardly from the hopper, as shown. The rear side of the hopper at its lower end is provided with a discharge-opening 14, which may be opened to any desired extent by means of a gate 141. The latter is here shown as provided with a vertical slot in which is a screw or bolt 15, which secures the same in place. An inclined spout 16, which is open on its front side at its upper portion to receive the rear end of the spout 13, is secured between the rearwardly-extending arms 5 of the saddle and projects downwardly below the plow-beam and immediately in rear of the plow-standard 2. This spout 16 serves to convey the fertilizer discharged therein by the spout 13 to the drill or furrow opened by the plow.

A rocking lever 17, which is preferably angular in form, as here shown, is pivotally mounted on one side of the saddle by means of a pivot-bolt 18. Its front end is pivotally connected by a bolt 19 to the lower end of the link 20, the latter being pivotally connected to the hopper near the front end thereof by a bolt 21. The said link is provided with a series of adjusting-openings 22, in any one of which the bolt 21 may be inserted in order to cause the hopper to lie at any required angle, and hence regulate the quantity of the fertilizer discharged therefrom. The gate 141 also serves to regulate and predetermine the quantity of fertilizer discharged from the hopper. A ground-wheel 23 is mounted between the bracket-arms 8 on a journal 24. The said ground-wheel is provided on one side with laterally-projecting tappets 25, which are suitably spaced apart, which successively engage the rear end of the rocking lever 17 to rock the lever, and hence cause the latter to impart rocking motion to the hopper. As the tappets 25 successively pass the rear end of the rocking lever the latter strikes them, so as to jar the hopper, and hence prevent the fertilizer from lodging in the hopper, the jarring motion of the latter serving to keep the fertilizer constantly in motion and causing it to be evenly distributed into the drill or furrow.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A fertilizer-distributer, comprising in combination with a plow-stock, a saddle secured to the plow-beam and having arms projecting rearwardly therefrom, bracket-arms secured to the arms of the saddle, a tappet-wheel mounted between the bracket-arms, an inclined discharge-spout in rear of the plow-beam and secured between the rearwardly-extending arms of the saddle, a rocking lever pivotally mounted on the saddle, standard-bars secured to the lever, a rocking hopper mounted between the said standard-bars, and a link connecting the rocking lever to the hopper, substantially as described.

2. A fertilizer-distributer, comprising in combination with a plow-stock, a saddle secured to the plow-beam and having arms projecting rearwardly therefrom, bracket-arms secured to the arms of the saddle, a tappet-wheel mounted between the bracket-arms, an inclined discharge-spout in rear of the plow-beam and secured between the rearwardly-extending arms of the saddle, a rocking lever pivotally mounted on the saddle, standard-bars secured to the lever, a rocking hopper mounted between the said standard-bars, and an adjustable connection between the rocking lever and the hopper to dispose the latter at any initial inclination, substantially as described.

In testimony whereof I have hereunto set my hand in presence of two subscribing witnesses.

JAMES H. HOWARD.

Witnesses:
   W. S. SMITH,
   W. J. DAVENPORT.